(12) United States Patent
Kamo et al.

(10) Patent No.: US 12,198,865 B2
(45) Date of Patent: *Jan. 14, 2025

(54) HIGH-VOLTAGE FEED-THROUGH CAPACITOR WITH ELEMENT BODY, THROUGH-CONDUCTOR, CASE, COVER, AND TUBE

(71) Applicant: TDK CORPORATION, Tokyo (JP)

(72) Inventors: Yuta Kamo, Tokyo (JP); Kenichi Kamehashi, Tokyo (JP); Hisashi Tanaka, Tokyo (JP)

(73) Assignee: TDK CORPORATION, Tokyo (JP)

( * ) Notice: Subject to any disclaimer, the term of this patent is extended or adjusted under 35 U.S.C. 154(b) by 159 days.

This patent is subject to a terminal disclaimer.

(21) Appl. No.: 18/082,065

(22) Filed: Dec. 15, 2022

(65) Prior Publication Data

US 2023/0260715 A1 Aug. 17, 2023

(30) Foreign Application Priority Data

Feb. 17, 2022 (JP) .................................. 2022-022603

(51) Int. Cl.
*H01G 4/224* (2006.01)
*H01G 4/35* (2006.01)

(52) U.S. Cl.
CPC ............... *H01G 4/35* (2013.01); *H01G 4/224* (2013.01)

(58) Field of Classification Search
CPC ............ H01G 4/35; H01G 4/224; H01G 9/08; H01G 9/10; H01G 9/15; H01G 4/005; H01G 4/002; H01G 4/06; H01G 4/1227; H01G 4/236
See application file for complete search history.

(56) References Cited

U.S. PATENT DOCUMENTS

| 5,142,436 | A | * | 8/1992 | Lee | H01G 4/35 361/302 |
| 5,544,002 | A | * | 8/1996 | Iwaya | H01G 4/35 361/302 |
| 11,862,405 | B2 | * | 1/2024 | Kamo | H01G 9/15 |
| 2001/0036053 | A1 | | 11/2001 | Asada et al. | |

FOREIGN PATENT DOCUMENTS

| JP | H02224216 | A | * | 9/1990 | |
| JP | 3803258 | B2 | | 8/2006 | |
| JP | 4433198 | B2 | * | 3/2010 | ............. H01G 4/236 |
| KR | 940007429 | B1 | * | 8/1994 | |

OTHER PUBLICATIONS

Tables from Handbook of Fillers (Year: 2016).*

* cited by examiner

*Primary Examiner* — Nathan Milakovich
*Assistant Examiner* — Daniel M Dubuisson
(74) *Attorney, Agent, or Firm* — Oliff PLC

(57) ABSTRACT

An element body is formed with a through hole to be open at the first main surface and the second main surface opposing each other. A through-conductor includes a first portion located inside the through-hole and a second portion protruding from the second main surface. A case surrounds the element body and is electrically insulating. A cover surrounds the second portion and is electrically insulating. A tube covers the first portion and is electrically insulating. A resin is contained in the cover and is located in a space between an inner surface of the element body and the tube. The tube has an electrical resistivity equal to or greater than an electrical resistivity of the resin.

7 Claims, 5 Drawing Sheets

Fig.3

| EXAMPLE | ρ1 [Ω·m] | ρ2 [Ω·m] | ρ3 [Ω·m] | E [V/m] |
|---|---|---|---|---|
| 1 | $1.0 \times 10^{13}$ | $1.0 \times 10^{13}$ | $1.0 \times 10^{7}$ | $1.2 \times 10^{7}$ |
| 2 | $1.0 \times 10^{13}$ | $1.0 \times 10^{13}$ | $1.0 \times 10^{9}$ | $1.2 \times 10^{7}$ |
| 3 | $1.0 \times 10^{13}$ | $1.0 \times 10^{13}$ | $1.0 \times 10^{11}$ | $1.2 \times 10^{7}$ |
| 4 | $1.0 \times 10^{13}$ | $1.0 \times 10^{13}$ | $1.0 \times 10^{13}$ | $6.8 \times 10^{6}$ |
| 5 | $1.0 \times 10^{13}$ | $1.0 \times 10^{13}$ | $1.0 \times 10^{15}$ | $2.3 \times 10^{6}$ |
| 6 | $1.0 \times 10^{13}$ | $1.0 \times 10^{15}$ | $1.0 \times 10^{7}$ | $1.2 \times 10^{7}$ |
| 7 | $1.0 \times 10^{13}$ | $1.0 \times 10^{15}$ | $1.0 \times 10^{9}$ | $1.2 \times 10^{7}$ |
| 8 | $1.0 \times 10^{13}$ | $1.0 \times 10^{15}$ | $1.0 \times 10^{11}$ | $1.2 \times 10^{7}$ |
| 9 | $1.0 \times 10^{13}$ | $1.0 \times 10^{15}$ | $1.0 \times 10^{13}$ | $1.2 \times 10^{7}$ |
| 10 | $1.0 \times 10^{13}$ | $1.0 \times 10^{15}$ | $1.0 \times 10^{15}$ | $6.8 \times 10^{6}$ |
| 11 | $1.0 \times 10^{13}$ | $1.0 \times 10^{9}$ | $1.0 \times 10^{7}$ | $1.3 \times 10^{7}$ |
| 12 | $1.0 \times 10^{13}$ | $1.0 \times 10^{9}$ | $1.0 \times 10^{9}$ | $9.3 \times 10^{6}$ |
| 13 | $1.0 \times 10^{13}$ | $1.0 \times 10^{9}$ | $1.0 \times 10^{11}$ | $3.1 \times 10^{6}$ |
| 14 | $1.0 \times 10^{13}$ | $1.0 \times 10^{9}$ | $1.0 \times 10^{13}$ | $2.8 \times 10^{6}$ |
| 15 | $1.0 \times 10^{13}$ | $1.0 \times 10^{9}$ | $1.0 \times 10^{15}$ | $2.8 \times 10^{6}$ |
| 16 | $1.0 \times 10^{13}$ | $1.0 \times 10^{7}$ | $1.0 \times 10^{11}$ | $2.9 \times 10^{6}$ |
| 17 | $1.0 \times 10^{13}$ | $1.0 \times 10^{11}$ | $1.0 \times 10^{11}$ | $7.1 \times 10^{6}$ |
| 18 | $1.0 \times 10^{13}$ | $1.0 \times 10^{11}$ | $1.0 \times 10^{7}$ | $1.2 \times 10^{7}$ |
| 19 | $1.0 \times 10^{13}$ | $1.0 \times 10^{11}$ | $1.0 \times 10^{9}$ | $1.2 \times 10^{7}$ |
| 20 | $1.0 \times 10^{13}$ | $1.0 \times 10^{11}$ | $1.0 \times 10^{13}$ | $2.4 \times 10^{6}$ |
| 21 | $1.0 \times 10^{13}$ | $1.0 \times 10^{11}$ | $1.0 \times 10^{15}$ | $2.3 \times 10^{6}$ |

HIGH-VOLTAGE FEED-THROUGH CAPACITOR WITH ELEMENT BODY, THROUGH-CONDUCTOR, CASE, COVER, AND TUBE

BACKGROUND OF THE INVENTION

Field of the Invention

The present invention relates to a high-voltage feed-through capacitor.

Description of Related Art

Known high-voltage feed-through capacitors include an element body including a first main surface and a second main surface opposing each other, a through-conductor, a metal fitting, an insulation case, an insulation cover, an insulation tube, and a resin (for example, refer to Japanese Patent No. 3803258). The high-voltage feed-through capacitor includes a first electrode on the first main surface and a second electrode on the second main surface. The element body is formed with a through hole to be open at the first main surface and the second main surface. The through-conductor includes a first portion located inside the through-hole and a second portion protruding from the second main surface, and is electrically connected to the first electrode. The metal fitting is electrically connected to the second electrode. The insulation case surrounds the element body. The insulation cover surrounds the second portion. The insulation tube covers the first portion. The resin is contained in the insulation case and in the insulation cover.

SUMMARY OF THE INVENTION

An object of an aspect of the invention is to provide a high-voltage feed-through capacitor that improves reliability.

The high-voltage feed-through capacitor according to one aspect includes an element body including a first main surface and a second main surface opposing each other, a first electrode on the first main surface, a second electrode on the second main surface, a through-conductor, a metal fitting, a case, a cover, a tube, a first resin, and a second resin. The element body is formed with a through hole to be open at the first main surface and the second main surface. The through-conductor has an outer diameter smaller than an inner diameter of the through-hole and is electrically connected to the first electrode. The through-conductor includes a first portion located inside the through-hole, and a second portion protruding from the second main surface. The metal fitting is electrically connected to the second electrode. The case surrounds the element body and is electrically insulating. The cover surrounds the second portion and is electrically insulating. The tube covers the first portion and is electrically insulating. The first resin is contained in the case and coats the element body. The second resin is contained in the cover and is located in a space between an inner surface of the element body defining the through-hole and the tube. The tube has an electrical resistivity equal to or greater than an electrical resistivity of the second resin.

The present inventors have conducted investigations and studies on a high-voltage feed-through capacitor that improves reliability. As a result, the present inventors newly found the following matters.

An intensity of an electric field that is formed between the second electrode and the through-conductor has an influence on reliability of the high-voltage feed-through capacitor. Hereinafter, the intensity of the electric field formed between the second electrode and the through-conductor may be simply referred to as "inter-conductor electric field intensity". In a high-voltage feed-through capacitor in which the inter-conductor electric field intensity is high, dielectric breakdown tends to occur. The dielectric breakdown occurs, for example, due to discharging along an inner surface of the element body defining the through-hole. Therefore, in the high-voltage feed-through capacitor including a configuration of decreasing the inter-conductor electric field intensity, the dielectric breakdown tends not to occur. The high-voltage feed-through capacitor including the configuration of decreasing the inter-conductor electric field intensity improves reliability.

The present inventors have conducted investigations and studies on the configuration of decreasing the inter-conductor electric field intensity. As a result, the present inventors found that a relationship between an electrical resistivity of the tube and an electrical resistivity of the second resin has an influence on the inter-conductor electric field intensity. A configuration in which the tube has an electrical resistivity equal to or greater than an electrical resistivity of the second resin decreases the inter-conductor electric field intensity. The relationship between the electrical resistivity of the tube and the electrical resistivity of the second resin is not considered in the related art.

In the one aspect described above, the tube has the electrical resistivity equal to or greater than the electrical resistivity of the second resin. Therefore, the one aspect described above decreases the inter-conductor electric field intensity and improves reliability.

The present invention will become more fully understood from the detailed description given hereinafter and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 3 is a table illustrating a relationship between an electrical resistivity and an electric field intensity;

DETAILED DESCRIPTION OF EMBODIMENTS

Figure 1:
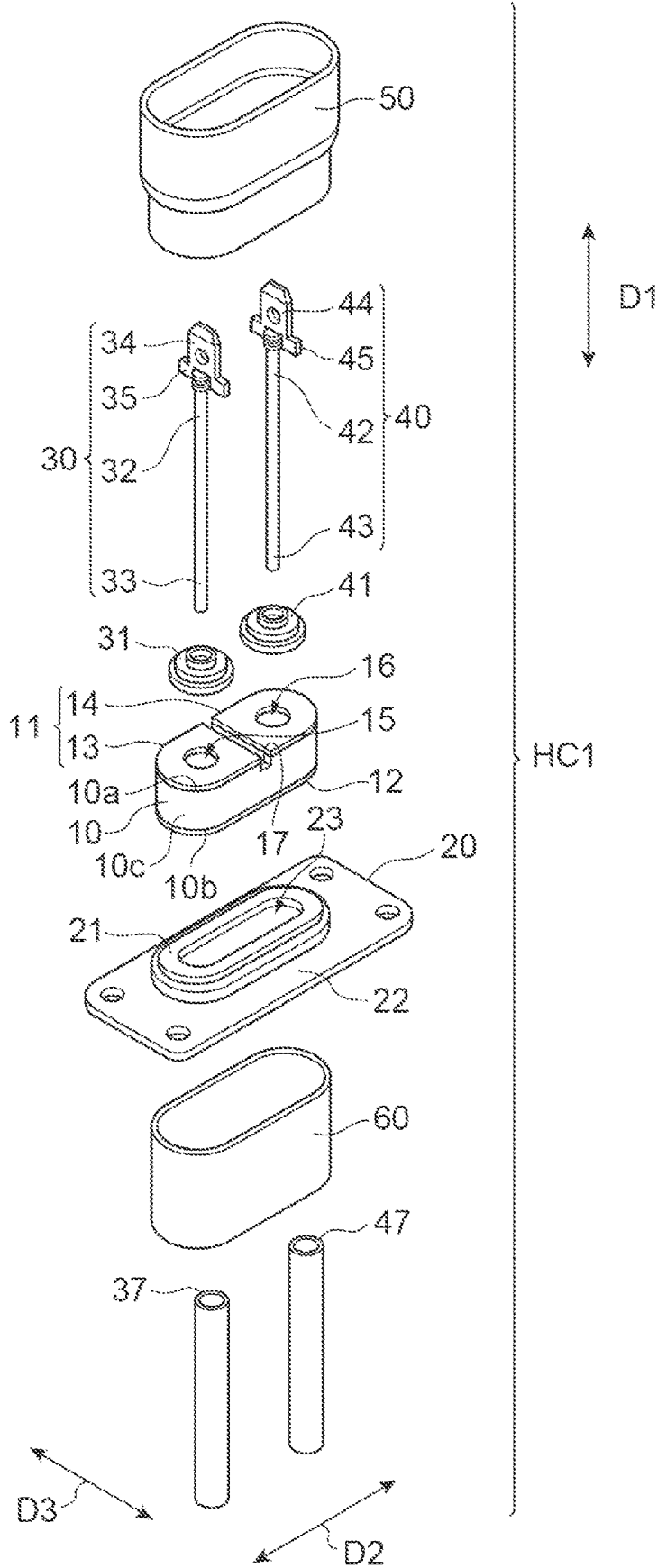
FIG. 1 is an exploded perspective view illustrating a high-voltage feed-through capacitor according to an embodiment.

Hereinafter, embodiments of the present invention will be described in detail with reference to the accompanying drawings. In the following description, the same elements or elements having the same functions are denoted with the same reference numerals and overlapped explanation is omitted.

Figure 2:
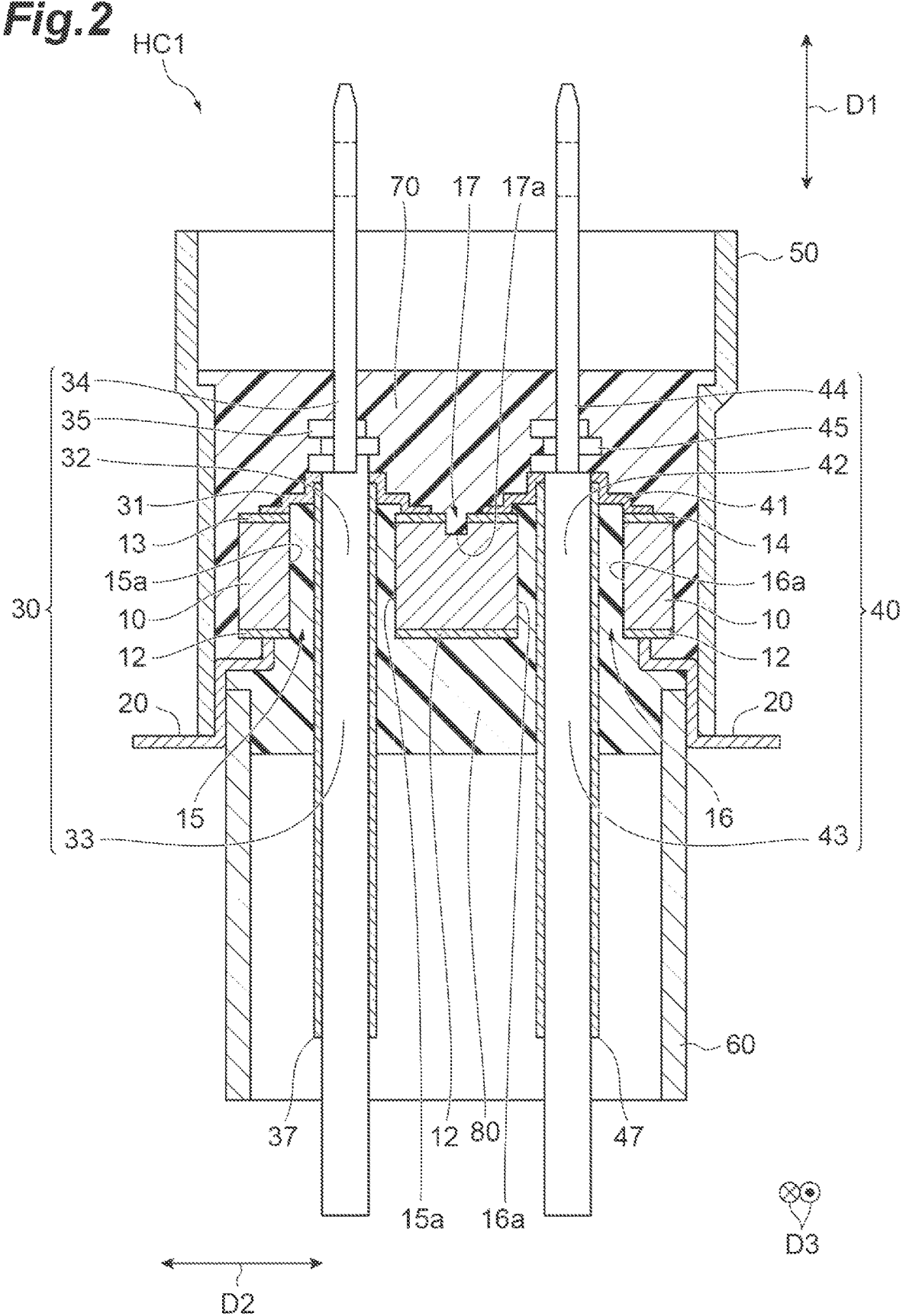
FIG. 2 is a view illustrating a cross-sectional configuration of the high-voltage feed-through capacitor according to the present embodiment.

A configuration of a high-voltage feed-through capacitor HC1 according to an embodiment will be described with reference to FIG. 1 and FIG. 2. FIG. 1 is an exploded perspective view illustrating a high-voltage feed-through capacitor according to the present embodiment. FIG. 2 is a view illustrating a cross-sectional configuration of the high-voltage feed-through capacitor according to the present embodiment.

The high-voltage feed-through capacitor HC1 includes an element body 10, an electrode 11, an electrode 12, a metal fitting 20, a plurality of through-conductors 30 and 40, a plurality of electrode connectors 31 and 41, a plurality of tubes 37 and 47, a case 50, a cover 60, a resin 70, and a resin 80. In the present embodiment, the high-voltage feed-through capacitor HC1 includes two through-conductors 30 and 40, two electrode connectors 31 and 41, and two tubes 37 and 47.

The element body 10 includes a main surface 10a and a main surface 10b opposing each other. In the present embodiment, the main surface 10a and the main surface 10b oppose each other in a first direction D1. The main surface 10a and the main surface 10b define both end surfaces of the element body 10 in the first direction D1. The element body 10 includes a side wall surface 10c. The side wall surface 10c extends in the first direction D1 to couple the main surface 10a and the main surface 10b in the first direction D1. The side wall surface 10c defines an outer periphery of the element body 10 when viewed in the first direction D1. Herein, a direction toward the main surface 10a from the main surface 10b is an upward direction. The main surface 10a is located above the main surface 10b in the upward direction. For example, when the main surface 10a constitutes a first main surface, the main surface 10b constitutes a second main surface.

The element body 10 includes, for example, an insulating material. The element body 10 includes, for example, ceramic. The ceramic includes, for example, $BaTiO_3$, $BaZrO_3$, $CaTiO_3$, or $MgTiO_3$. The element body 10 may include an additive added to the ceramic. The additive includes, for example, Si, Mg, Zr, Zn, Y, V, Al, or Mn.

The electrode 11 is disposed on the main surface 10a. The electrode 12 is disposed on the main surface 10b. The electrode 11 and the electrode 12 oppose each other in the first direction D1. The element body 10 is located between the electrode 11 and the electrode 12. Therefore, the electrode 11 and the electrode 12 indirectly oppose each other in the first direction D1 in a state in which the element body 10 is located between the electrode 11 and the electrode 12. The electrode 11 includes a pair of conductors 13 and 14. The conductors 13 and 14 are disposed on the main surface 10a. The conductors 13 and 14 are separated from each other on the main surface 10a. In the present embodiment, the conductors 13 and 14 are separated from each other in a second direction D2 intersecting the first direction D1. The conductor 13 opposes the electrode 12 in the first direction D1. The conductor 14 opposes the electrode 12 in the first direction D1. For example, when the electrode 11 constitutes a first electrode, the electrode 12 constitutes a second electrode.

The electrode 11 and the electrode 12 include an electrically conductive metal material. The electrically conductive metal material includes, for example, Ag. The electrode 11 and the electrode 12 may include a magnetic material in addition to the conductive metal material. The magnetic material includes, for example, Fe, Co, Ni, Cu, or Sr. For example, the magnetic material may include at least two or more elements selected from the group consisting of Fe, Co, Ni, Cu, and Sr. For example, the electrode 11 and the electrode 12 are formed through sintering a conductive paste applied to the main surface 10a and the main surface 10b. The conductive paste for forming the electrode 11 and the electrode 12 contains the above-described electrically conductive metal material.

As illustrated in FIG. 1 and FIG. 2, the element body 10 is formed with a plurality of through-holes 15 and 16. In the present embodiment, two through-holes 15 and 16 are formed in the element body 10. The element body 10 includes an inner surface 15a defining the through-hole 15, and an inner surface 16a defining the through-hole 16. The through-hole 15 is opened at the main surface 10a and the main surface 10b. The through-hole 15 passes through the element body 10 from the main surface 10a to the main surface 10b. The through-hole 16 is opened at the main surface 10a and the main surface 10b. The through-hole 16 passes through the element body 10 from the main surface 10a to the main surface 10b. The through-holes 15 and 16 have a circular shape when viewed in the first direction D1. The through-holes 15 and 16 may have a shape other than the circular shape.

The element body 10 is formed with a groove 17. In the present embodiment, the groove 17 is formed in the element body 10 to be located between the conductor 13 and the conductor 14 when viewed in the first direction D1. In the present embodiment, the first direction D1 coincides with a direction orthogonal to the main surface 10a. The conductor 13 and the conductor 14 are separated from each other by the groove 17. An electrode is not formed in the groove 17. The element body 10 includes a wall surface 17a defining the groove 17. The groove 17 extends in a third direction D3 intersecting the first direction D1 and the second direction D2. The groove 17 reaches both ends of the main surface 10a in the third direction D3. In the present embodiment, the first direction D1, the second direction D2, and the third direction D3 are orthogonal to each other.

The metal fitting 20 is electrically connected to the electrode 12. The metal fitting 20 supports the element body 10. As illustrated in FIG. 1, the metal fitting 20 includes a protruding portion 21 and a peripheral portion 22. The peripheral portion 22 surrounds the protruding portion 21. The protruding portion 21 protrudes from the peripheral portion 22 toward the element body 10 when viewed in the second direction D2. The protruding portion 21 is formed with an opening 23. An opening 23 is formed in the protruding portion 21. The opening 23 passes through the protruding portion 21 in the first direction D1. In the present embodiment, the opening 23 is located in the central region of the protruding portion 21 when viewed in the first direction D1. The metal fitting 20 has a rectangular shape when viewed in the first direction D1. The rectangular shape includes a shape in which a corner is rounded or a shape in which a corner is chamfered. The metal fitting 20 may have a shape other than the rectangular shape.

The metal fitting 20 includes an electrically conductive metal material. The electrically conductive metal material includes, for example, Fe, Cu, or a Cu—Zn alloy.

The element body 10 is disposed on the metal fitting 20 in such a manner that the electrode 12 is electrically connected to the metal fitting 20. In the present embodiment, the element body 10 is supported by the metal fitting 20 in such a manner that the protruding portion 21 is in contact with the electrode 12. The metal fitting 20 is arranged to be grounded.

The protruding portion 21 and the electrode 12 are coupled to each other through a solder.

The through-conductor 30 is inserted into the through-hole 15 and passes therethrough, and has an outer diameter smaller than an inner diameter of the through-hole 15. The through-conductor 30 is electrically connected to the electrode 11. The through-conductor 30 includes a portion 32 located inside the through-hole 15, a portion 33 protruding from the main surface 10b, a tab portion 34, and a caulking portion 35. The portion 32 is separated from the inner surface 15a. In the present embodiment, the portion 32 is integral with the portion 33. Each of the portion 32 and the portion 33 includes an electrical conductor. The portion 32 and the portion 33 have a cylindrical shape when viewed in the first direction D1. The portion 32 and the portion 33 may have a shape other than the cylindrical shape. The tab portion 34 includes a tab connector. The caulking portion 35 electrically and physically connects the portions 32 and 33 and the tab portion 34. For example, when the portion 32 constitutes a first portion, the portion 33 constitutes a second portion.

The through-conductor 30 is electrically connected to the conductor 13. The portions 32 and 33 of the through-conductor 30 are inserted into the electrode connector 31, the through-hole 15, and the opening 23 and pass therethrough. The electrode connector 31 electrically connects the tab portion 34 and caulking portion 35, and the conductor 13. For example, the through-conductor 30 includes an electrically conductive metal material. The electrically conductive metal material includes, for example, Fe, Cu, or a Cu—Zn alloy.

The through-conductor 40 is inserted into the through-hole 16 and passes therethrough, and has an outer diameter smaller than an inner diameter of the through-hole 16. The through-conductor 40 is electrically connected to the electrode 11. The through-conductor 40 includes a portion 42 located inside the through-hole 16, a portion 43 protruding from the main surface 10b, a tab portion 44, and a caulking portion 45. The portion 42 is separated from the inner surface 16a. In the present embodiment, the portion 42 is integral with the portion 43. Each of the portion 42 and the portion 43 includes an electrical conductor. The portion 42 and the portion 43 have a cylindrical shape when viewed in the first direction D1. The portion 42 and the portion 43 may have a shape other than the cylindrical shape. The tab portion 44 includes a tab connector. The caulking portion 45 electrically and physically connects the portions 42 and 43, and the tab portion 44. For example, when the portion 42 constitutes a first portion, the portion 43 constitutes a second portion.

The through-conductor 40 is electrically connected to the conductor 14. The portions 42 and 43 of the through-conductor 40 are inserted into the electrode connector 41, the through-hole 16, and the opening 23 and pass therethrough. The electrode connector 41 electrically connects the tab portion 44 and caulking portion 45, and the conductor 14. For example, the through-conductor 40 includes an electrically conductive metal material. The electrically conductive metal material includes, for example, Fe, Cu, or a Cu—Zn alloy.

The tube 37 covers the through-conductor 30, and has an electrical insulation property. That is, the tube 37 is electrically insulating. The tube 37 covers the portion 32 and the portion 33. In the present embodiment, the tube 37 covers the entirety of the portion 32 and a part of the portion 33. A region included in the through-conductor 30 and covered with the insulating tube 37 is inserted into the through-hole 15 and the opening 23 and passes therethrough. The region covered with the tube 37 includes the entirety of the portion 32 and the part of the portion 33.

The tube 47 covers the through-conductor 40, and has an electrical insulation property. That is, the tube 47 is electrically insulating. The tube 47 covers the portion 42 and the portion 43. In the present embodiment, the tube 47 covers the entirety of the portion 42 and a part of the portion 43. A region included in the through-conductor 40 and covered with the insulating tube 47 is inserted into the through-hole 16 and the opening 23 and passes therethrough. The region covered with the tube 47 includes the entirety of the portion 42 and the part of the portion 43.

Each of the tubes 37 and 47 includes an insulating rubber. The insulating rubber includes, for example, a silicone rubber.

The case 50 has a hollow tubular shape. The case 50 may have a shape other than the hollow tubular shape. The case 50 houses the element body 10, and the electrodes 11 and 12 therein. The case 50 includes a housing surrounding the element body 10, and the electrodes 11 and 12. In the present embodiment, the case 50 houses the entirety of the element body 10, the entirety of the electrodes 11 and 12, a part of the metal fitting 20, and a part of the cover 60 therein. The case 50 is disposed above the cover 60. The case 50 is disposed to surround the element body 10. That is, the case 50 surrounds the element body 10. In the present embodiment, the case 50 surrounds the element body 10, the electrode 11, the electrode 12, the protruding portion 21, the electrode connectors 31 and 41, the portions 32 and 42, the tab portions 34 and 44, and the caulking portions 35 and 45. The case 50 is physically connected to the metal fitting 20. The case 50 is connected to the metal fitting 20 in such a manner that an inner side surface of the case 50 is in contact with an outer side surface of the protruding portion 21. The inner side surface of the case 50 includes a region being in contact with the outer side surface of the protruding portion 21. The region being in contact with the outer side surface of the protruding portion 21 is located at a lower end portion of the case 50. A lower end surface of the case 50 is in contact with an upper surface of the peripheral portion 22.

The cover 60 has a hollow tubular shape. The cover 60 may have a shape other than the hollow tubular shape. The cover 60 is disposed to surround the portion 33 and the portion 43. That is, the cover 60 surrounds the portion 33 and the portion 43. In the present embodiment, the cover 60 surrounds the portions 33 and 43, and the tubes 37 and 47. The cover 60 is physically connected to the metal fitting 20. The cover 60 is connected to the metal fitting 20 in such a manner that an outer side surface of the cover 60 is in contact with an inner side surface of the protruding portion 21 when viewed in the second direction D2 and the third direction D3. The outer side surface of the cover 60 includes a region being in contact with the inner side surface of the protruding portion 21. The region being in contact with the inner side surface of the protruding portion 21 is located at an upper end portion of the outer side surface of the cover 60. The cover 60 includes a housing surrounding the portions 33 and 43.

The case 50 and the cover 60 include an electrically insulating material. The case 50 and the cover 60 have an electrical insulation property. That is, the case 50 and the cover 60 are electrically insulating. The insulating material includes, for example, polybutylene terephthalate (PBT), polyethylene terephthalate (PET), or modified melamine. The insulating material may include an inorganic material. The inorganic material includes, for example, a glass powder or a ceramic powder. The glass powder includes, for example, an industrial glass powder. The ceramic powder includes, for example, a $SiO_2$ powder, an $Al_2O_3$ powder, talc ($Mg_3Si_4O_{10}(OH)_2$), aluminum nitride (AlN), or silicon nitride ($Si_3N_4$).

As illustrated in FIG. 2, the resin 70 is contained in the case 50. An inner side of the case 50 is partially filled with the resin 70. In the present embodiment, the resin 70 is contained in the case 50 to coat the element body 10. That is, the resin 70 coats the element body 10. The resin 70 is disposed between the case 50, and the element body 10, protruding portion 21, electrode connectors 31 and 41, tab portions 34 and 44, and caulking portions 35 and 45. The resin 70 fills a space between the case 50, and the protruding portion 21, element body 10, electrode connectors 31 and 41, tab portions 34 and 44, and caulking portions 35 and 45. The resin 70 is in contact with the element body 10, the electrode 11, the metal fitting 20, the electrode connectors 31 and 41, the through-conductors 30 and 40, and the case 50. In the present embodiment, the resin 70 is in contact with the side wall surface 10c, the wall surface 17a, the electrode 11, the protruding portion 21, the electrode connectors 31 and 41, the tab portions 34 and 44, the caulking portions 35 and 45, and the case 50. An upper edge of the resin 70 is located at a height at which the caulking portions 35 and 45 are embedded. A lower edge of the resin 70 is in contact with the protruding portion 21. The upper edge of the resin 70 represents an edge located on an upward side between both edges of the resin 70 in the first direction D1. The lower edge of the resin 70 represents an edge located on a downward side between both the edges of the resin 70 in the first direction D1.

The resin 80 is contained in the cover 60. The inside of case 50 is partially filled with the resin 70. An inner side of the cover 60 is partially filled with the resin 80. In the present embodiment, the resin 80 is contained in the cover 60 and is located in a space between the inner surface 15a and the portion 32 and a space between the inner surface 16a and the portion 42. The resin 80 is located in a space between the inner surface 15a and the tube 37, and a space between the inner surface 16a and the tube 47. The resin 80 fills a space between the cover 60, and the protruding portion 21, inner surfaces 15a and 16a, and tubes 37 and 47. The resin 80 is in contact with the element body 10, the electrode 12, the metal fitting 20, the tubes 37 and 47, and the cover 60. In the present embodiment, the resin 80 is in contact with the inner surfaces 15a and 16a, the electrode 12, the protruding portion 21, the tubes 37 and 47, and the cover 60. A portion included in the tube 37 and being in contact with the resin 80 is located at least at the inside of the through-hole 15. A portion included in the tube 47 and being in contact with the resin 80 is located at least at the inside of the through-hole 16. An upper edge of the resin 80 is in contact with lower surfaces of the electrode connectors 31 and 41. A lower edge of the resin 80 is located on a downward side of a lower surface of the peripheral portion 22. The upper edge of the resin 80 represents an edge located on an upward side between both edges of the resin 80 in the first direction D1. The lower edge of the resin 80 represents an edge located on a downward side between both the edges of the resin 80 in the first direction D1.

For example, when the resin 70 constitutes a first resin, the resin 80 constitutes a second resin.

The resin 70 and the resin 80 include an electrically insulating material. The resin 70 and the resin 80 have an electrical insulation property. That is, the resin 70 and the resin 80 are electrically insulating. The insulating material includes, for example, a thermosetting resin. The thermosetting resin includes, for example, an epoxy resin, a urethane resin, a phenolic resin, or a silicone resin. The resin 70 and the resin 80 may respectively include insulating materials different from each other. In the present embodiment, the resin 70 and the resin 80 include the epoxy resin.

Next, description will be given of a relationship between an electrical resistivity of each of the resins 70 and 80, and the tubes 37 and 47, and an intensity of an electric field formed between the electrode 12 and the through-conductors 30 and 40.

The present inventors have conducted a simulation to clarify the above-described relationship. The simulation uses a model including the element body 10, the electrodes 11 and 12, the through-conductor 40, the tube 47, and the resins 70 and 80 in accordance with the configuration of the high-voltage feed-through capacitor HC1. In the model, the intensity of an electric filed that is formed between the electrode 12 and the through-conductor 40 when applying a voltage between the electrode 11 and the electrode 12 is obtained. A DC voltage of 10 kV is applied between the electrode 11 and the electrode 12.

Results of the simulation are illustrated in FIG. 3. FIG. 3 is a table illustrating a relationship between an electrical resistivity and an electric field intensity.

The model used in the above-described simulation does not include the through-conductor 30 and the tube 37. However, it can be understood that the results illustrated in FIG. 3 are obtained even in a case of conducting the simulation by using a model including the through-conductor 30 and the tube 37 instead of the model including the through-conductor 40 and the tube 47 as long as a first condition and a second condition are satisfied. In the first condition, a shape and a size of the through-conductor 30 and the tube 37 are set to be equivalent to a shape and a size of the through-conductor 40 and the tube 47. In the second condition, a positional relationship between the through-conductor 30, and the element body 10 and the electrodes 11 and 12 is set to be equivalent to a positional relationship between the through-conductor 40, and the element body 10 and the electrodes 11 and 12.

In Example 1, an electrical resistivity ρ1 of the resin 70 is $1.0 \times 10^{13}$ Ω·m, an electrical resistivity ρ2 of the resin 80 is $1.0 \times 10^{13}$ Ω·m, and an electrical resistivity ρ3 of the tube 47 is $1.0 \times 10^7$ Ω·m. In this case, an intensity E of an electric field formed between the electrode 12 and the through-conductor 40 is $1.2 \times 10^7$ V/m.

Hereinafter, the intensity E of the electric field formed between the electrode 12 and the through-conductor 40 is referred to as "electric field intensity E".

In Example 2, the electrical resistivity ρ1 is $1.0 \times 10^{13}$ Ω·m, the electrical resistivity ρ2 is $1.0 \times 10^{13}$ Ω·m, and the electrical resistivity ρ3 is $1.0 \times 10^9$ Ω·m. In this case, the electric field intensity E is $1.2 \times 10^7$ V/m.

In Example 3, the electrical resistivity ρ1 is $1.0 \times 10^{13}$ Ω·m, the electrical resistivity ρ2 is $1.0 \times 10^{13}$ Ω·m, and the electrical resistivity ρ3 is $1.0 \times 10^{11}$ Ω·m. In this case, the electric field intensity E is $1.2 \times 10^7$ V/m.

In Example 4, the electrical resistivity ρ1 is $1.0 \times 10^{13}$ Ω·m, the electrical resistivity ρ2 is $1.0 \times 10^{13}$ Ω·m, and the electrical resistivity ρ3 is $1.0 \times 10^{13}$ Ω·m. In this case, the electric field intensity E is $6.8 \times 10^6$ V/m.

In Example 5, the electrical resistivity ρ1 is $1.0 \times 10^{13}$ Ω·m, the electrical resistivity ρ2 is $1.0 \times 10^{13}$ Ω·m, and the electrical resistivity ρ3 is $1.0 \times 10^{15}$ Ω·m. In this case, the electric field intensity E is $2.3 \times 10^6$ V/m.

In Example 6, the electrical resistivity $\rho1$ is $1.0\times10^{13}$ $\Omega\cdot m$, the electrical resistivity $\rho2$ is $1.0\times10^{15}$ $\Omega\cdot m$, and the electrical resistivity $\rho3$ is $1.0\times10^{7}$ $\Omega\cdot m$. In this case, the electric field intensity E is $1.2\times10^{7}$ V/m.

In Example 7, the electrical resistivity $\rho1$ is $1.0\times10^{13}$ $\Omega\cdot m$, the electrical resistivity $\rho2$ is $1.0\times10^{15}$ $\Omega\cdot m$, and the electrical resistivity $\rho3$ is $1.0\times10^{9}$ $\Omega\cdot m$. In this case, the electric field intensity E is $1.2\times10^{7}$ V/m.

In Example 8, the electrical resistivity $\rho1$ is $1.0\times10^{13}$ $\Omega\cdot m$, the electrical resistivity $\rho2$ is $1.0\times10^{15}$ $\Omega\cdot m$, and the electrical resistivity $\rho3$ is $1.0\times10^{11}$ $\Omega\cdot m$. In this case, the electric field intensity E is $1.2\times10^{7}$ V/m.

In Example 9, the electrical resistivity $\rho1$ is $1.0\times10^{13}$ $\Omega\cdot m$, the electrical resistivity $\rho2$ is $1.0\times10^{15}$ $\Omega\cdot m$, and the electrical resistivity $\rho3$ is $1.0\times10^{13}$ $\Omega\cdot m$. In this case, the electric field intensity E is $1.2\times10^{7}$ V/m.

In Example 10, the electrical resistivity $\rho1$ is $1.0\times10^{13}$ $\Omega\cdot m$, the electrical resistivity $\rho2$ is $1.0\times10^{15}$ $\Omega\cdot m$, and the electrical resistivity $\rho3$ is $1.0\times10^{15}$ $\Omega\cdot m$. In this case, the electric field intensity E is $6.8\times10^{6}$ V/m.

In Example 11, the electrical resistivity $\rho1$ is $1.0\times10^{13}$ $\Omega\cdot m$, the electrical resistivity $\rho2$ is $1.0\times10^{9}$ $\Omega\cdot m$, and the electrical resistivity $\rho3$ is $1.0\times10^{7}$ $\Omega\cdot m$. In this case, the electric field intensity E is $1.3\times10^{7}$ V/m.

In Example 12, the electrical resistivity $\rho1$ is $1.0\times10^{13}$ $\Omega\cdot m$, the electrical resistivity $\rho2$ is $1.0\times10^{9}$ $\Omega\cdot m$, and the electrical resistivity $\rho3$ is $1.0\times10^{9}$ $\Omega\cdot m$. In this case, the electric field intensity E is $9.3\times10^{6}$ V/m.

In Example 13, the electrical resistivity $\rho1$ is $1.0\times10^{13}$ $\Omega\cdot m$, the electrical resistivity $\rho2$ is $1.0\times10^{9}$ $\Omega\cdot m$, and the electrical resistivity $\rho3$ is $1.0\times10^{11}$ $\Omega\cdot m$. In this case, the electric field intensity E is $3.1\times10^{6}$ V/m.

In Example 14, the electrical resistivity $\rho1$ is $1.0\times10^{13}$ $\Omega\cdot m$, the electrical resistivity $\rho2$ is $1.0\times10^{9}$ $\Omega\cdot m$, and the electrical resistivity $\rho3$ is $1.0\times10^{13}$ $\Omega\cdot m$. In this case, the electric field intensity E is $2.8\times10^{6}$ V/m.

In Example 15, the electrical resistivity $\rho1$ is $1.0\times10^{13}$ $\Omega\cdot m$, the electrical resistivity $\rho2$ is $1.0\times10^{9}$ $\Omega\cdot m$, and the electrical resistivity $\rho3$ is $1.0\times10^{15}$ $\Omega\cdot m$. In this case, the electric field intensity E is $2.8\times10^{6}$ V/m.

In Example 16, the electrical resistivity $\rho1$ is $1.0\times10^{13}$ $\Omega\cdot m$, the electrical resistivity $\rho2$ is $1.0\times10^{7}$ $\Omega\cdot m$, and the electrical resistivity $\rho3$ is $1.0\times10^{11}$ $\Omega\cdot m$. In this case, the electric field intensity E is $2.9\times10^{6}$ V/m.

In Example 17, the electrical resistivity $\rho1$ is $1.0\times10^{13}$ $\Omega\cdot m$, the electrical resistivity $\rho2$ is $1.0\times10^{11}$ $\Omega\cdot m$, and the electrical resistivity $\rho3$ is $1.0\times10^{11}$ $\Omega\cdot m$. In this case, the electric field intensity E is $7.1\times10^{6}$ V/m.

In Example 18, the electrical resistivity $\rho1$ is $1.0\times10^{13}$ $\Omega\cdot m$, the electrical resistivity $\rho2$ is $1.0\times10^{11}$ $\Omega\cdot m$, and the electrical resistivity $\rho3$ is $1.0\times10^{7}$ $\Omega\cdot m$. In this case, the electric field intensity E is $1.2\times10^{7}$ V/m.

In Example 19, the electrical resistivity $\rho1$ is $1.0\times10^{13}$ $\Omega\cdot m$, the electrical resistivity $\rho2$ is $1.0\times10^{11}$ $\Omega\cdot m$, and the electrical resistivity $\rho3$ is $1.0\times10^{9}$ $\Omega\cdot m$. In this case, the electric field intensity E is $1.2\times10^{7}$ V/m.

In Example 20, the electrical resistivity $\rho1$ is $1.0\times10^{13}$ $\Omega\cdot m$, the electrical resistivity $\rho2$ is $1.0\times10^{11}$ $\Omega\cdot m$, and the electrical resistivity $\rho3$ is $1.0\times10^{13}$ $\Omega\cdot m$. In this case, the electric field intensity E is $2.4\times10^{6}$ V/m.

In Example 21, the electrical resistivity $\rho1$ is $1.0\times10^{13}$ $\Omega\cdot m$, the electrical resistivity $\rho2$ is $1.0\times10^{11}$ $\Omega\cdot m$, and the electrical resistivity $\rho3$ is $1.0\times10^{15}$ $\Omega\cdot m$. In this case, the electric field intensity E is $2.3\times10^{6}$ V/m.

Figure 4:
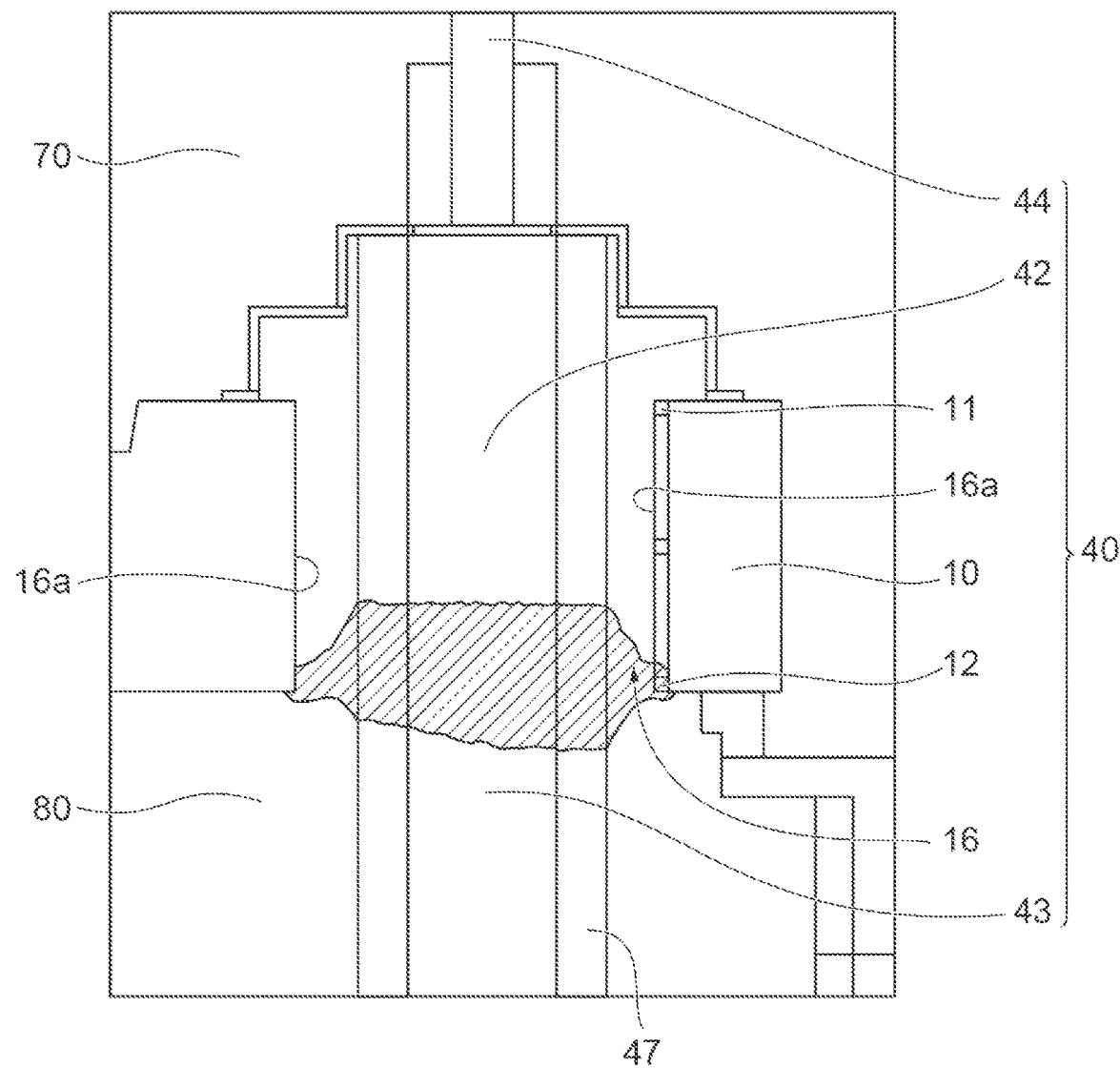
FIG. 4 is a diagram illustrating an example of a simulation result of the electric field intensity.

In Examples 1 to 3, Examples 6 to 9, Example 11, Example 18, and Example 19 in which the electrical resistivity $\rho3$ is smaller than the electrical resistivity $\rho2$, the electric field intensity E is $1.0\times10^{7}$ V/m or greater as also illustrated in FIG. 4. The electric field intensity E is $1.0\times10^{7}$ V/m or greater represents that the intensity of the electric field formed between the electrode 12 and the through-conductor 40 is high. According to a finding obtained by the present inventors, in the configuration in which the electric field intensity E is $1.0\times10^{7}$ V/m or greater, dielectric breakdown tends to occur in a high-voltage feed-through capacitor.

Figure 5:
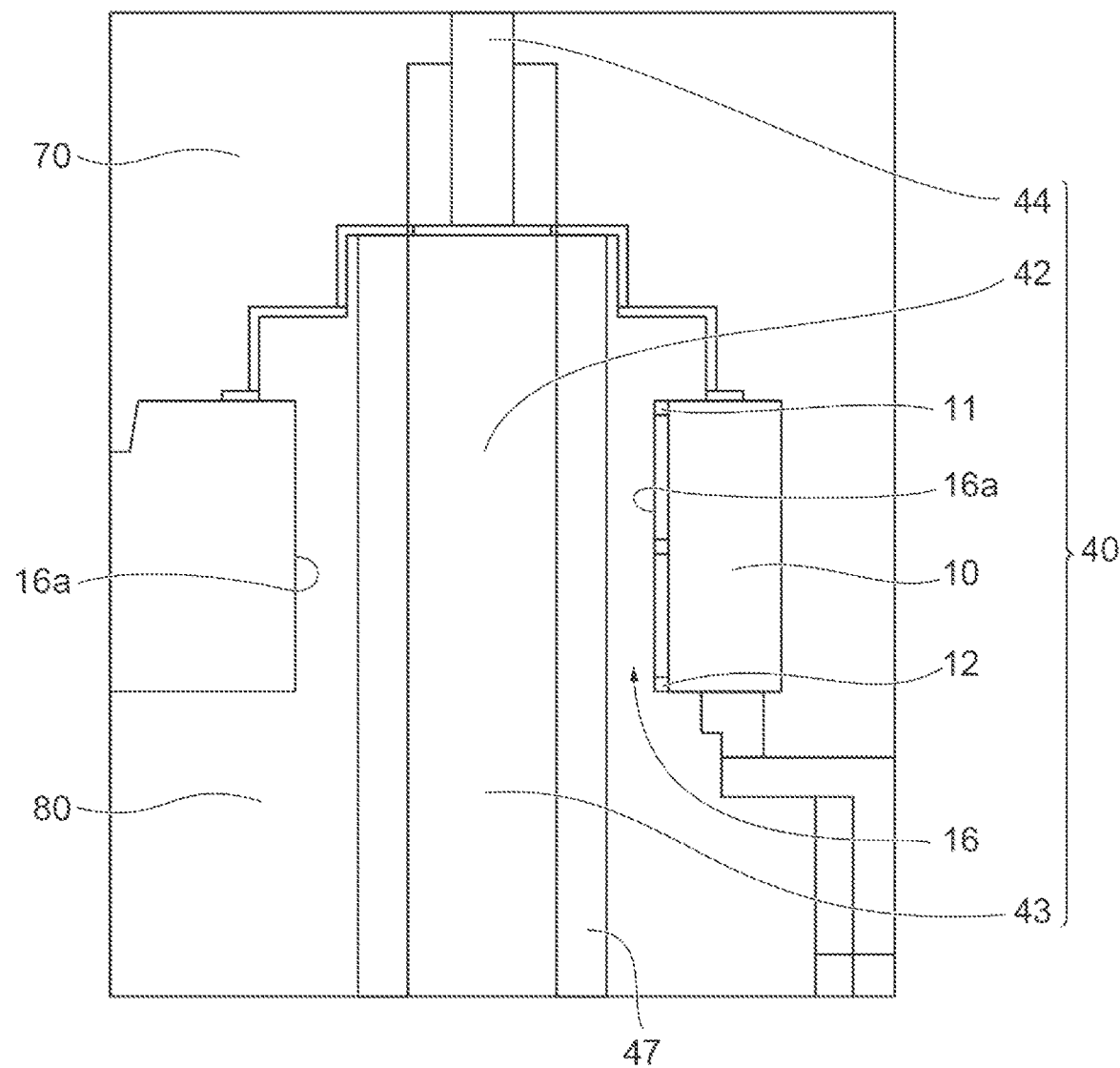
FIG. 5 is a diagram illustrating another example of the simulation result of the electric field intensity.

In contrast, in Example 4, Example 5, Example 10, Example 12 to Example 17, Example 20, and Example 21 in which the electrical resistivity $\rho3$ is equal to or greater than the electrical resistivity $\rho2$, the electric field intensity E is less than $1.0\times10^{7}$ V/m as also illustrated in FIG. 5. A configuration in which the electric field intensity E is less than $1.0\times10^{7}$ V/m represents that the intensity of the electric field formed between the electrode 12 and the through-conductor 40 is low. Therefore, it could be understood that the dielectric breakdown tends not to occur in a high-voltage feed-through capacitor in which the electrical resistivity $\rho3$ is equal to or greater than the electrical resistivity $\rho2$.

FIG. 4 is a view illustrating an example of simulation results of the electric field intensity. FIG. 5 is a view illustrating another example of the simulation results of the electric field intensity. In FIG. 4 and FIG. 5, a region where the electric field intensity E is $1.0\times10^{7}$ V/m or greater is hatched. As described above, in Example 4, Example 5, Example 10, Example 12 to Example 17, Example 20, and Example 21, the electric field intensity E is less than $1.0\times10^{7}$ V/m. Therefore, in FIG. 5, a hatched region does not exist.

The following points can be understood based on Example 4, Example 5, Example 10, Example 12 to Example 17, Example 20, and Example 21.

In a high-voltage feed-through capacitor in which the electrical resistivity $\rho3$ is equal to or greater than $1\times10^{9}$ $\Omega\cdot m$ and equal to or less than $1.0\times10^{15}$ $\Omega\cdot m$, the dielectric breakdown tends not to occur.

In a high-voltage feed-through capacitor in which a ratio of the electrical resistivity $\rho2$ to the electrical resistivity $\rho3$ is equal to or greater than 0.000001 and equal to or less than 1, the dielectric breakdown tends not to occur. In a high-voltage feed-through capacitor in which a ratio of the electrical resistivity $\rho2$ to the electrical resistivity $\rho3$ is equal to or greater than 0.000001 and equal to or less than 0.01, the dielectric breakdown further tends not to occur.

The following points can be understood based on Example 4, Example 5, Example 10, Example 12 to Example 17, Example 20, and Example 21.

In a high-voltage feed-through capacitor in which the electrical resistivity $\rho2$ is equal to or greater than $1.0\times10^{17}$ $\Omega\cdot m$ and equal to or less than $1.0\times10^{15}$ $\Omega\cdot m$, the dielectric breakdown tends not to occur.

As described above, the high-voltage feed-through capacitor HC1 includes a configuration in which the tubes 37 and 47 have the electrical resistivity equal to or greater than the electrical resistivity of the resin 80.

Therefore, the high-voltage feed-through capacitor HC1 decreases the intensity of the electric field formed between the electrode 12 and the through-conductor 40 and the intensity of the electric field formed between the electrode 12 and the through-conductor 30, and thus improves reliability.

The electrical resistivity of the tube 37 may be equivalent to the electrical resistivity of the tube 47. "Equivalent" does not necessarily represent that values are equal to each other. Even in a case where a minute difference within a range set in advance, a manufacturing error, or a measurement error is included in values, the values may be considered to be equivalent to each other.

The electrical resistivity of the tube 37 and the electrical resistivity of the tube 47 may be different from each other.

The high-voltage feed-through capacitor HC1 may include a configuration in which the electrical resistivity of each of the tubes 37 and 47 is equal to or greater than $1.0 \times 10^9$ Ω·m and equal to or less than $1.0 \times 10^{15}$ Ω·m.

The high-voltage feed-through capacitor HC1 including this configuration simply and reliably realizes a configuration in which the dielectric breakdown tends not to occur.

The high-voltage feed-through capacitor HC1 may include a configuration in which the ratio of the electrical resistivity of the resin 80 to the electrical resistivity of each of the tubes 37 and 47 is equal to or greater than 0.000001 and equal to or less than 1.

The high-voltage feed-through capacitor HC1 including this configuration simply and reliably realizes a configuration in which the dielectric breakdown tends not to occur.

The high-voltage feed-through capacitor HC1 may include a configuration in which the ratio of the electrical resistivity of the resin 80 to the electrical resistivity of each of the tubes 37 and 47 is equal to or greater than 0.000001 and equal to or less than 0.01.

The high-voltage feed-through capacitor HC1 including this configuration simply and reliably realizes a configuration in which the dielectric breakdown tends not to occur.

The high-voltage feed-through capacitor HC1 may include a configuration in which the electrical resistivity of the resin 80 is equal to or greater than $1.0 \times 10^7$ Ω·m and equal to or less than $1.0 \times 10^{15}$ Ω·m.

The high-voltage feed-through capacitor HC1 including this configuration simply and reliably realizes a configuration in which the dielectric breakdown tends not to occur.

The high-voltage feed-through capacitor HC1 may include a configuration in which the resin 70 and the resin 80 include an epoxy resin.

The high-voltage feed-through capacitor HC1 including this configuration simply realizes the resin 70 and the resin 80 having electrical resistivities are different from each other.

Although the embodiment of the present invention has been described above, the present invention is not necessarily limited to the embodiment, and the embodiment can be variously changed without departing from the scope of the invention.

The high-voltage feed-through capacitor HC1 includes the two through-conductors 30 and 40, but the high-voltage feed-through capacitor HC1 may include three or more through-conductors. The high-voltage feed-through capacitor HC1 may include any one through-conductor of the two through-conductors 30 and 40. That is, the high-voltage feed-through capacitor HC1 may include a single through-conductor. The number of each of through-holes formed in the element body 10, the tubes, the conductors included in the electrode 11, and the electrode connectors may be set to correspond to the number of through-conductors.

What is claimed is:

1. A high-voltage feed-through capacitor, comprising:
   an element body including a first main surface and a second main surface opposing each other and being formed with a through-hole to be open at the first main surface and the second main surface;
   a first electrode on the first main surface;
   a second electrode on the second main surface;
   a through-conductor having an outer diameter smaller than an inner diameter of the through-hole and being electrically connected to the first electrode, the through-conductor including a first portion located inside the through-hole and a second portion protruding from the second main surface;
   a metal fitting being electrically connected to the second electrode;
   a case surrounding the element body and being electrically insulating;
   a cover surrounding the second portion and being electrically insulating;
   a tube covering the first portion and being electrically insulating;
   a first resin contained in the case and coating the element body; and
   a second resin contained in the cover and being located in a space between an inner surface of the element body defining the through-hole and the tube,
   wherein the tube has an electrical resistivity equal to or greater than an electrical resistivity of the second resin, and
   the electrical resistivity of the tube is equal to or greater than $1 \times 10^9$ Ω·m and equal to or less than $1 \times 10^{15}$ Ω·m.

2. The high-voltage feed-through capacitor according to claim 1,
   wherein the electrical resistivity of the second resin is equal to or greater than $1 \times 10^7$ Ω·m and equal to or less than $1 \times 10^{15}$ Ω·m.

3. The high-voltage feed-through capacitor according to claim 2,
   wherein a ratio of the electrical resistivity of the second resin to the electrical resistivity of the tube is equal to or greater than 0.000001 and equal to or less than 1.

4. The high-voltage feed-through capacitor according to claim 3,
   wherein a ratio of the electrical resistivity of the second resin to the electrical resistivity of the tube is equal to or greater than 0.000001 and equal to or less than 0.01.

5. The high-voltage feed-through capacitor according to claim 1,
   wherein the first resin and the second resin include an epoxy resin.

6. The high-voltage feed-through capacitor according to claim 1,
   wherein a ratio of the electrical resistivity of the second resin to the electrical resistivity of the tube is equal to or greater than 0.000001 and equal to or less than 1.

7. The high-voltage feed-through capacitor according to claim 6,
   wherein a ratio of the electrical resistivity of the second resin to the electrical resistivity of the tube is equal to or greater than 0.000001 and equal to or less than 0.01.

* * * * *